(12) United States Patent
Herndon

(10) Patent No.: US 8,657,547 B2
(45) Date of Patent: Feb. 25, 2014

(54) HAMMER UNION WING NUT

(75) Inventor: Lawrence A. Herndon, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 123 days.

(21) Appl. No.: 13/364,028

(22) Filed: Feb. 1, 2012

(65) Prior Publication Data

US 2012/0126532 A1 May 24, 2012

Related U.S. Application Data

(63) Continuation-in-part of application No. 12/291,441, filed on Nov. 11, 2008, now Pat. No. 8,118,528.

(51) Int. Cl.
*F16B 37/08* (2006.01)

(52) U.S. Cl.
USPC .......................................... 411/432; 411/433

(58) Field of Classification Search
USPC .............. 411/432, 433, 435, 909; 285/33, 34, 285/381.1, 381.2
See application file for complete search history.

(56) References Cited

U.S. PATENT DOCUMENTS

| | | | |
|---|---|---|---|
| 604,224 A | 5/1898 | Bennik | |
| 625,448 A | 5/1899 | Jaenichen | |
| 1,329,126 A * | 1/1920 | Leming | 138/89.4 |
| 1,706,317 A | 3/1929 | Oakes | |
| 1,953,582 A | 4/1934 | Belknap | |
| 2,377,581 A | 6/1945 | Shaffrey | |
| 2,736,227 A * | 2/1956 | Stroble | 411/433 |
| 4,274,323 A | 6/1981 | Resnicow | |
| 4,531,872 A | 7/1985 | Warkotsh | |
| 4,659,273 A | 4/1987 | Dudley | |
| 4,768,909 A * | 9/1988 | Warkotsch | 411/433 |
| 4,923,349 A | 5/1990 | Logsdon | |
| 4,930,961 A | 6/1990 | Weis | |
| 5,226,678 A | 7/1993 | Petranto | |
| 5,921,734 A * | 7/1999 | Kataoka | 411/269 |
| 5,944,467 A | 8/1999 | Yuta | |
| 6,302,446 B1 * | 10/2001 | Spears et al. | 285/33 |
| 6,799,930 B1 | 10/2004 | More et al. | |
| 6,945,569 B1 | 9/2005 | Diaz et al. | |
| 2010/0158635 A1 * | 6/2010 | Rodman | 411/432 |

OTHER PUBLICATIONS

Brochure Titled Hamer Unions, SPM Flow Control, Inc. (1999).
International Search Report and Written Opinion of the International Searching Authority dated Apr. 17, 2013, in corresponding PCT Application PCT/US2013/022744.

* cited by examiner

*Primary Examiner* — Gary Estremsky
(74) *Attorney, Agent, or Firm* — McAfee & Taft

(57) ABSTRACT

The present disclosure provides a wing nut including an arcuate body, an arcuate insert, a retaining ring, and a support member. The arcuate body defines a first portion of a mounting thread and the arcuate insert defines a second portion of a mounting thread. The arcuate insert and the arcuate body are complementary to one another such that when connected, the arcuate insert and the arcuate body define an upper ring and a collar and the first and second portions of the mounting thread define a complete mounting thread for receiving a threaded male pipe end. The retaining ring is for securing the collar, and the support member is for securing the upper ring. The wing nut is designed to replace an existing wing nut on a hammer union connection that has deformed lugs. The wing nut can be safely replaced in the field without any special equipment or training.

12 Claims, 5 Drawing Sheets

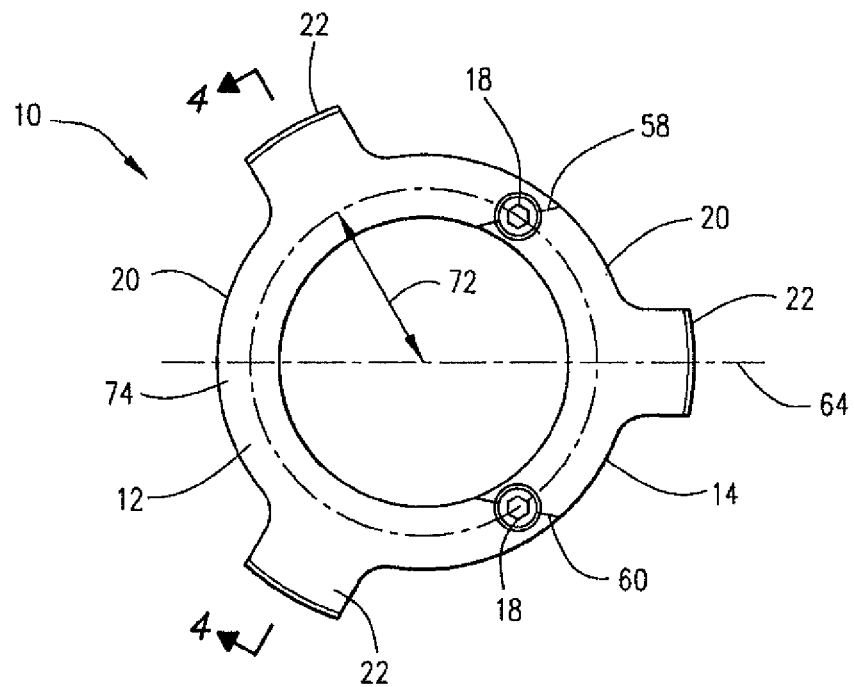
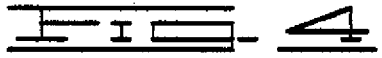

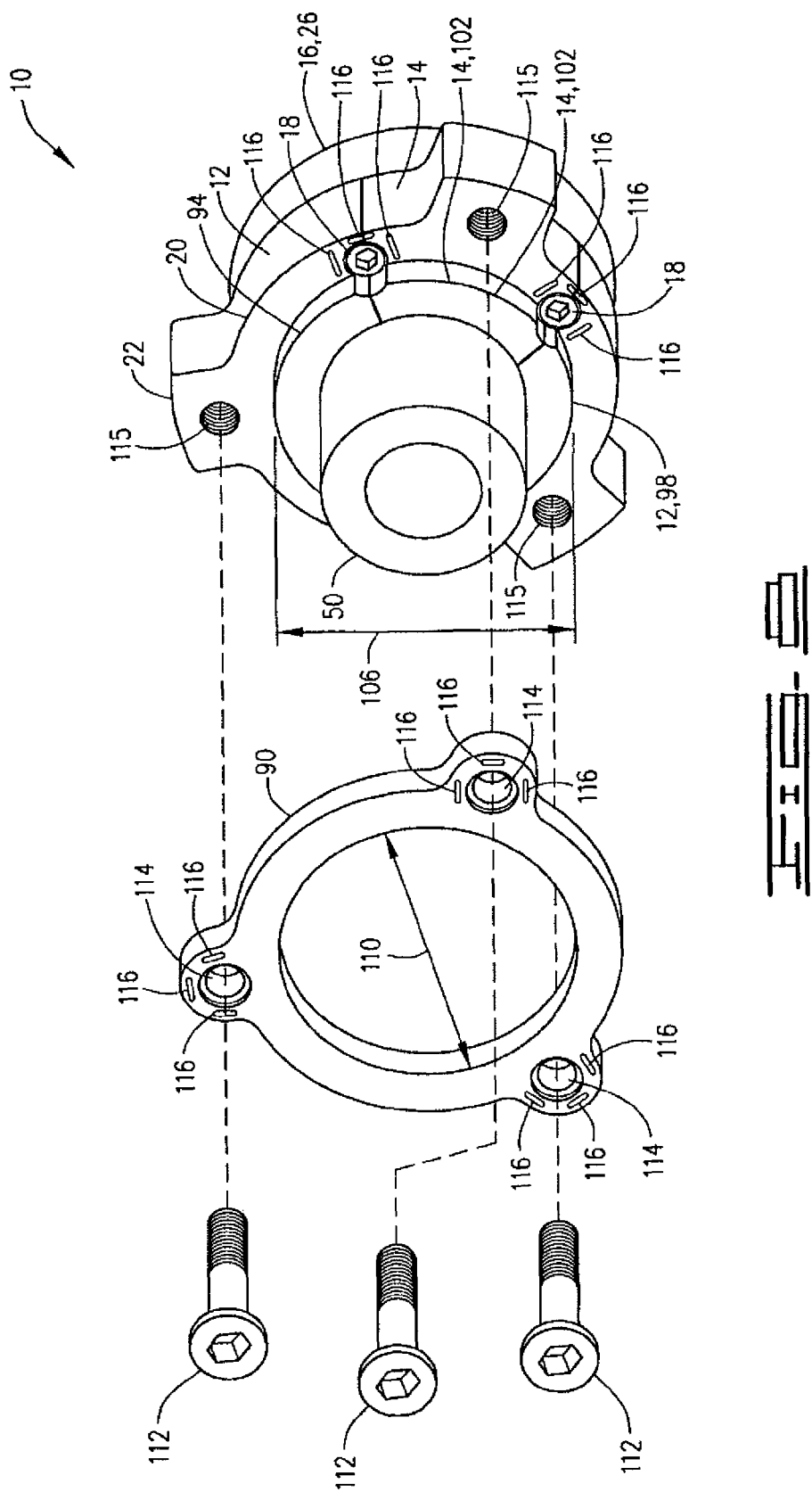

HAMMER UNION WING NUT

The present application is a continuation-in-part of U.S. application Ser. No. 12/291,441, filed on Nov. 11, 2004, and incorporated herein by reference.

BACKGROUND

Hammer unions are commonly employed to join pipe segments together. Typically, the wing nut component of the hammer union, which has a wing nut pipe segment with a threaded wing nut having integrated lugs, is tightened onto a male threaded pipe component by hammering upon the lugs. When the wing nut becomes unusable, it is usually necessary to remove the entire wing nut pipe segment from service.

It is standard practice to capture the wing nut on the wing nut pipe segment which prevents users from removing or replacing the wing nut. Once captured, the wing nut and the wing nut pipe segment are generally inseparable.

Often, before the full, useful life of the wing nut pipe segment is reached, one or more lugs on the wing nut will become deformed. A wing nut with one or more deformed lugs cannot reliably be mated to a male threaded piece of piping equipment. The piping equipment, however, would generally still be usable if the wing nut is replaced. At this time, there is no safe, field-installable wing nut that can be used to replace deformed, damaged or worn-out wing nuts which are captured on the wing nut pipe segment.

Currently, when a wing nut becomes deformed due to damaged or deformed lug(s), the end of the wing nut pipe segment on which the wing nut is installed is cut off, the deformed wing nut is replaced with a new wing nut, and the pipe is machined and welded together. Unfortunately, this repair approach often has quality problems. These quality problems lead to safety issues.

Safety of a joined hammer union is a major concern because hammer unions are often used to connect piping carrying large volumes of fluid under high pressures. Due to the internal forces on the pipe joint, hammer union joints commonly fail in an explosive manner. A misaligned wing nut on a hammer union joint may hold pressure for a period of time, but may ultimately fail as the pressure pushes against the joint.

An attempted field repair of a wing nut using common cutting and welding techniques creates a significant risk for misaligned or poorly welded joints. In normal field situations, there are few or no field personnel qualified to perform the highly skilled welding and machining operations required for a safe repair. Additionally, there is usually an absence of qualified welding and machining standards for field personnel to follow.

Since field repairs may result in significant down time, there is also an economic impact when removing a pipe section to replace a deformed wing nut. In manufacturing and drilling operations, down time directly impacts a company's cost of operations.

As identified herein, there is a need for a hammer union wing nut that does not require welding or machining. Additionally, there is a need for a field replaceable hammer union wing nut that may be easily and efficiently installed by field personnel.

SUMMARY

This disclosure provides a wing nut that requires no welding or machining operations. The wing nut may be installed in the field.

One embodiment discloses a wing nut including an arcuate body, an arcuate insert, a retaining ring, and a support member. The arcuate body defines a first portion of a mounting thread and the arcuate insert defines a second portion of a mounting thread. The arcuate insert is complementary to the arcuate body such that when connected to the arcuate body, the arcuate body and arcuate insert define an upper ring and a collar and the first and second portions of the mounting thread define a complete mounting thread for receiving a threaded male pipe end. The retaining ring is for securing the collar, and the support member is for securing the upper ring.

Another embodiment discloses a wing nut including an arcuate body, an arcuate insert, a retaining ring, and a support member. The arcuate body defines a first portion of a mounting thread. The arcuate insert defines a second portion of a mounting thread. The arcuate insert is complementary to the arcuate body such that when connected to the arcuate body, the arcuate body and arcuate insert define an upper ring and a collar and the first and second portions of the mounting thread define a complete mounting thread for receiving a threaded male pipe end. The retaining ring is disposed about the collar for securing the collar, and the support member is disposed about a pilot on the upper ring for securing the upper ring.

Still another embodiment discloses a wing nut including a first arcuate body, a second arcuate body, a retaining ring, and a support member. The first arcuate body has a first portion of a mounting thread thereon. The first arcuate body defines a radial arc greater than 180 degrees. The first arcuate body has a first and second clearance end defining a circumferential gap therebetween that is large enough for the first arcuate body to receive a pipe therethrough, wherein the first and second clearance ends have an acute angle.

The second arcuate body of this embodiment has a second portion of a mounting thread thereon. Further, the second arcuate body defines a radial arc complementary to the radial arc of the first arcuate body that when connected to the first arcuate body defines an upper ring and a collar. Still further, the second arcuate body has first and second mating ends for engaging the first and second clearance ends, wherein the first and second mating ends have an obtuse angle.

Continuing with this embodiment, the retaining ring is disposed about the collar defined by the connected first and second arcuate bodies. The first and second threaded portions define a complete connecting thread for receiving a threaded male pipe when the first and second arcuate bodies are connected. Further, the support member is adapted to engage a pilot on the upper ring that is defined by the connection of the first and second arcuate bodies.

BRIEF DESCRIPTION OF THE DRAWINGS

FIG. 3 is a top plan view of an embodiment of the wing nut.

FIG. 6 is a top perspective view depicting an embodiment of the assembled wing nut.

FIG. 8 is a perspective view of an alternative embodiment of the wing nut including a support member.

DETAILED DESCRIPTION

Figure 1:
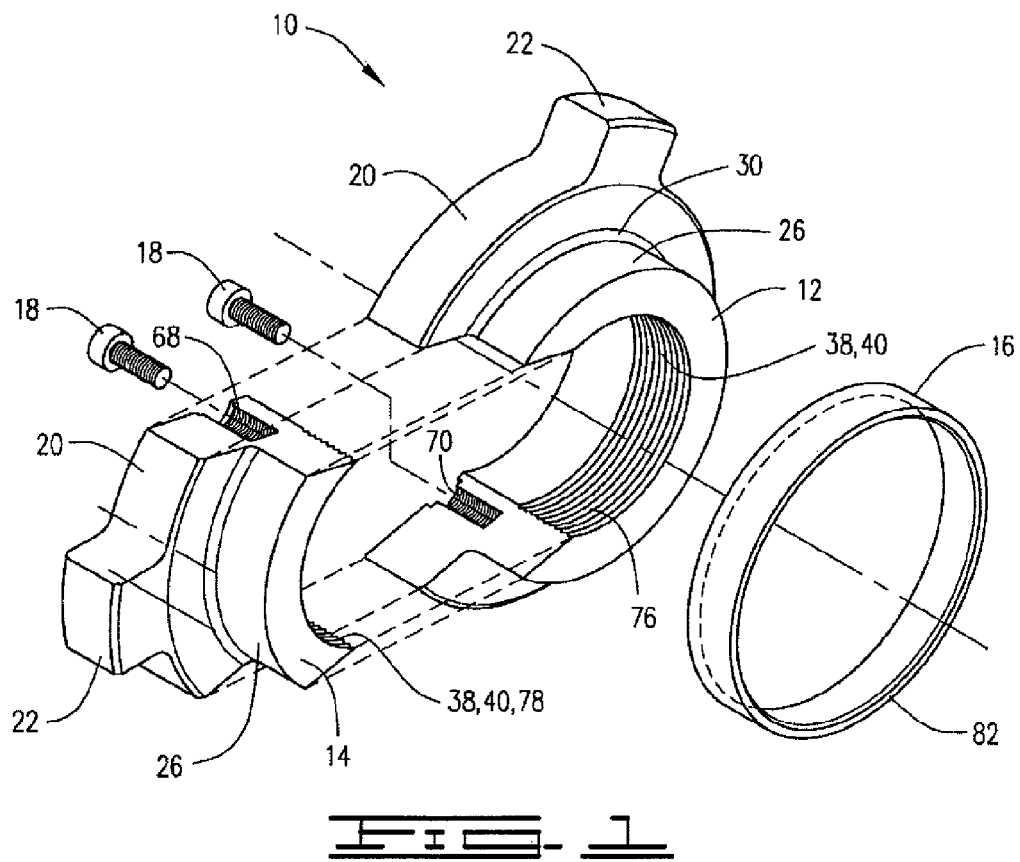
FIG. 1 is an exploded bottom perspective view of an embodiment of the wing nut.

This disclosure is directed to a wing nut that requires no welding or machining operations. The wing nut installation does not require any special qualifications or procedures, and can easily be accomplished by field maintenance personnel in normal field situations.

Generally, wing nut 10 is selected to correspond to a defined nominal pipe diameter. It is anticipated that a series of wing nuts 10 will be available for different sizes of pipes being employed.

Referring to FIGS. 1-8 wing nut 10 is generally comprised of arcuate body 12, arcuate insert 14, retaining ring 16, and attachment devices 18. Attachment devices 18 are used to connect, or join, arcuate insert 14 with arcuate body 12. Arcuate body 12 may also be referred to as the first arcuate body 12, and arcuate insert 14 may also be referred to as the second arcuate body 14.

Wing nut 10 is preferably an alloy or carbon steel piece capable of withstanding high pressure when fully assembled and installed. Arcuate body 12 and arcuate insert 14 are preferably manufactured out of the same material. A non-limiting example of the material to form arcuate body 12 and arcuate insert 14 is to use a circular metal slug of hot-rolled grade 4340 steel. Retaining ring 16 may be manufactured from the same material as arcuate body 12 and arcuate insert 14. However, retaining ring 16 is preferably manufactured out of a material different than that of arcuate body 12 and arcuate insert 14. A non-limiting example is to use grade 4140 steel tubing for retaining ring 16. Furthermore, retaining ring 16 preferably has material properties with specific capabilities as described herein. Wing nut 10 may be fabricated from other types of materials. These materials are preferably matched to a pipe size and have a desired pressure containment capability.

As depicted in the drawings, assembled wing nut 10 defines an annular body 20 with at least one lug 22 thereon. Annular body 20, which may be referred to as upper ring 20, has inner diameter 21 and first outer diameter 24, and in the embodiment shown has three lugs 22 defined thereon. Assembled wing nut 10 has a collar 26 extending longitudinally from annular body 20. Collar 26 may be referred to as lower ring 26. Collar 26 has second outer diameter 28, which is preferably smaller than first outer diameter 24, so that shoulder 30 is defined by, and extends between, first and second outer diameters 24 and 28. Wing nut 10 has a length 32. Collar 26 has a collar length 34 that is shorter than length 32. Collar 26 has a threaded inner surface 38 extending along collar length 34 to define mounting or connecting threads 40, and has a collar thickness 42. Wing nut 10 is thus compatible with a male thread 36, and will receive a threaded male pipe segment as will be described in more detail herein.

Figure 2:
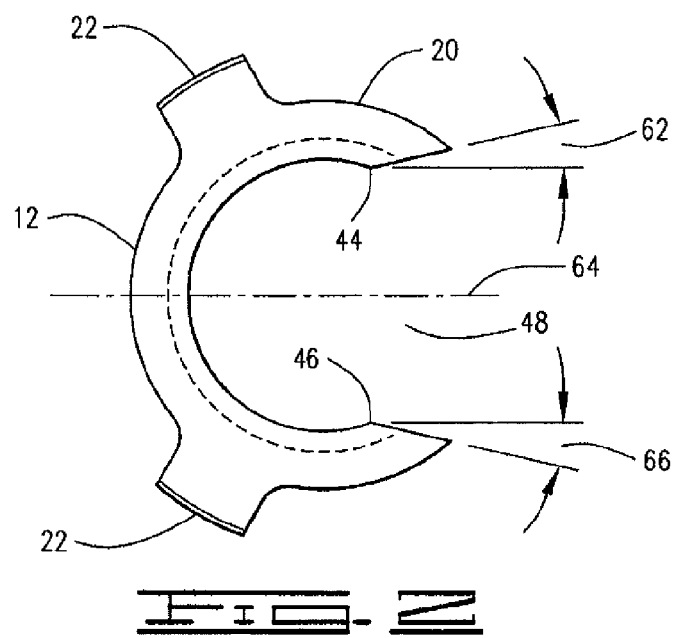
FIG. 2 depicts a top plan view of an embodiment of an arcuate body.
Figure 4:
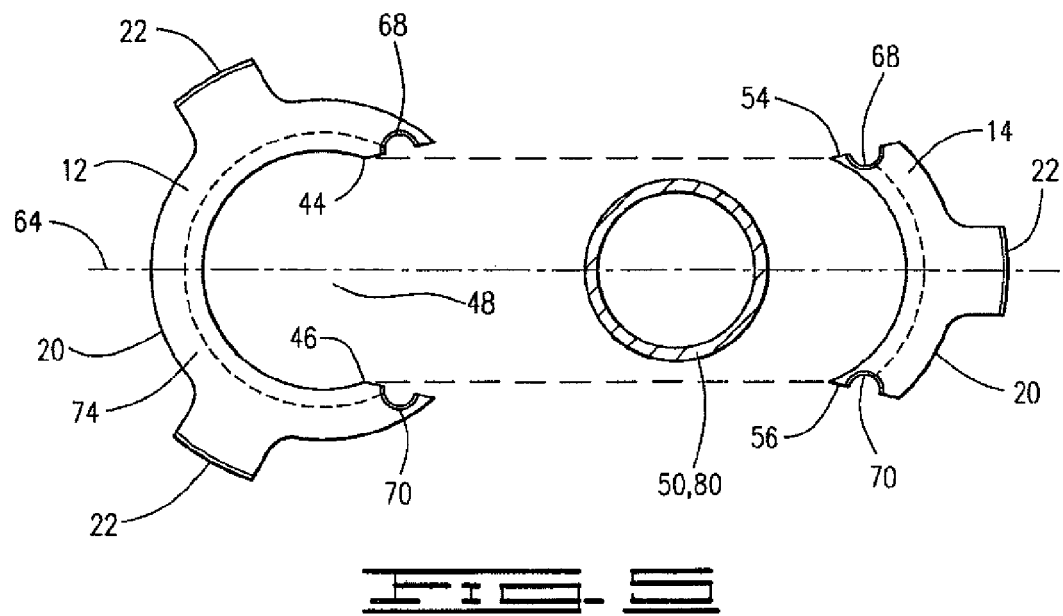
FIG. 4 is a cross-sectional view of an embodiment of the wing nut taken from FIG. 3 along line 4-4.

As depicted in FIG. 2, arcuate body 12 has an arc that is preferably equal to or greater than arcuate insert 14, and that is at least circumferentially 180 degrees. The embodiment shown has an arc of approximately 220 degrees. Arcuate insert 14 will complement arcuate body 12 so that when assembled, arcuate body 12 and arcuate insert 14 comprise wing nut 10 and define upper ring 20 and collar 26 thereon.

Arcuate body 12 has a first clearance end 44 and a second clearance end 46 defining a gap or space 48 therebetween. Gap 48 will receive a pipe segment 50 therethrough. When pipe segment 50 is received through gap 48, and arcuate body 12 and arcuate insert 14 are connected, the assembled wing nut 10 will provide fluid communication between pipe segments 50 and 52 when connecting threads 40 are properly mated with male threads 36 on pipe segment 52.

Arcuate insert 14 has first and second mating ends 54 and 56. First clearance end 44 of arcuate body 12 will mate with first mating end 54 of arcuate insert 14. Second clearance end 46 of arcuate body 12 will mate with second mating end 56 of arcuate insert 14. First and second seams, or joints 58 and 60, are formed when arcuate insert 14 is inserted or positioned in gap 48 with first clearance end 44 adjacent to and engaging first mating end 54, and second clearance end 46 adjacent to and engaging second mating end 56.

Joints 58 and 60 are designed to ensure a tight seal between arcuate body 12 and arcuate insert 14. Thus, it is preferred that joints 58 and 60 have a radially straight seam as depicted in FIGS. 2, 3 and 6. However, the shape of the seam between joints 58 and 60 is not limited to any particular shape or configuration. Joint 58 preferably has an exemplary angle 62 of about 13 degrees. However, it is understood that angle 62 may be any angle that allows arcuate body 12 and arcuate insert 14 to be joined. Similarly, joint 60 preferably has an exemplary angle 66 of about negative 13 degrees. It is also understood that angle 66 may be any angle that allows arcuate body 12 and arcuate insert 14 to be joined. In FIG. 2, angles 62 and 66 are measured relative to horizontal centerline 64.

Figure 5:
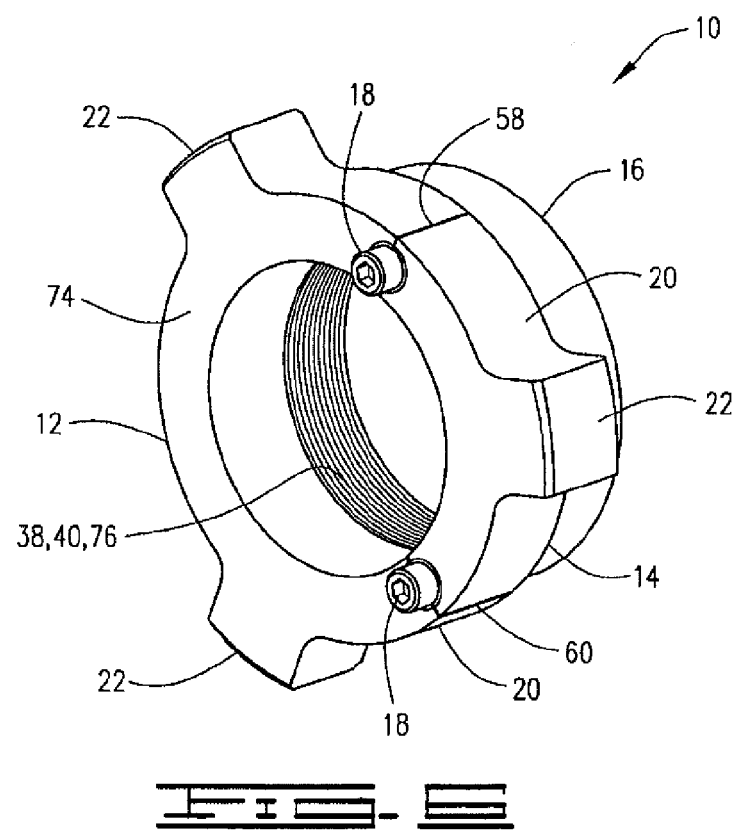
FIG. 5 is an exploded plan view of an embodiment of the wing nut with a pipe section.

Referring to FIG. 5, attachment openings 68 and 70 are preferably threaded, countersunk attachment openings centered on joints 58 and 60, and, referring to FIG. 3, having a radial center point 72 positioned on upper surface 74 of assembled wing nut 10. Preferably, radial center point 72 is positioned between first outer diameter 24 and inner diameter 21. Attachment devices 18 are threaded connectors that will hold arcuate body 12 and arcuate insert 14 in place so that connecting threads 40 may receive male thread segment 36, such as that on pipe segment 52, to connect pipe segments 50 and 52.

Figure 7:
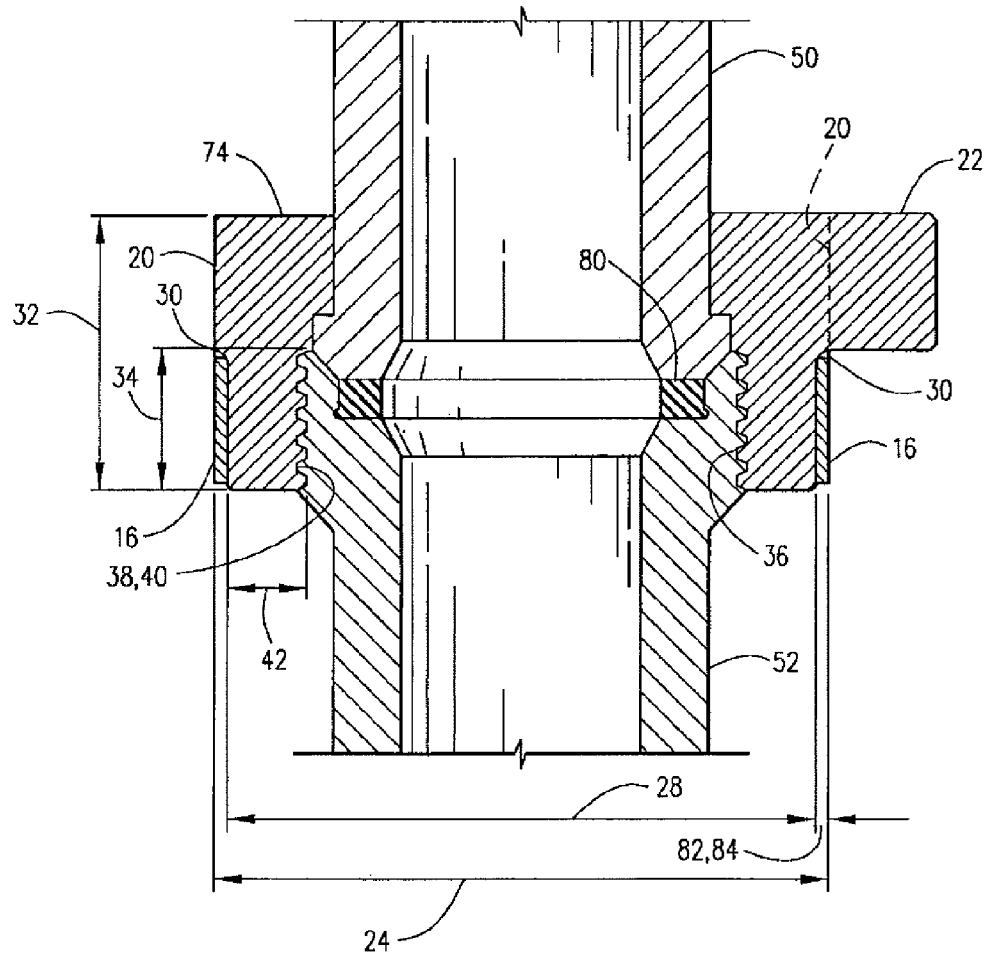
FIG. 7 is a cross-sectional view of an embodiment of the wing nut installed on an un-threaded pipe segment with a shoulder.

Arcuate body 12 and arcuate insert 14 each define a portion of connecting threads 40 as depicted in FIGS. 1, 6 and 7. Arcuate body 12 has first thread portion 76 of mounting thread 40 thereon, while arcuate insert 14 has second thread portion 78 of mounting thread 40 thereon. When arcuate body 12 and arcuate insert 14 are connected and aligned, first and second threaded portions 76 and 78 form connecting or mounting thread 40. The alignment of first and second mounting thread 76 and 78 to form connecting thread 40 is facilitated by the insertion of attachment devices 18 into attachment openings 68 and 70. In the preferred embodiment, connecting threads 40 are preferably machined into arcuate body 12 and arcuate insert 14 while they are joined. As will be understood, arcuate body 12 and arcuate insert 14 may be threaded prior to being machined from a single piece into the separate arcuate body 12 and arcuate insert 14. Connecting threads 40 may also be part of a cast or forged wing nut 10. As described above, connecting threads 40 are located on threaded inner surface 38 of collar 26.

In the embodiments shown in FIGS. 1-8, three lugs 22 are employed. A minimum of one lug 22 is required. The maximum number of lugs 22 is limited by the available circumferential space on annular body 20. However, it is anticipated that the number of lugs 22 will typically be between two and four. Lugs 22 extend radially outward from annular body 20. The spacing between lugs 22 is not critical in that lugs 22 may be uniformly spaced or not uniformly spaced.

FIG. 5 depicts a plan view of wing nut 10 with three lugs 22 and wing nut pipe segment 50. FIG. 5 depicts wing nut pipe segment 50 positioned to be received by arcuate body 12 through gap 48. In the preferred embodiment, wing nut pipe segment 50 is able to pass through gap 48 without external force applied. In other words, gap 48 has sufficient clearance for pipe segment 50 to pass therethrough.

Retaining ring 16, depicted in FIGS. 1, 7, and 8, is designed to secure arcuate body 12 and arcuate insert 14 in the assembled state. Retaining ring 16 is preferably comprised of a material having properties sufficient to resist the circumferential stress exerted upon it by arcuate body 12 and arcuate insert 14, once installed. It is preferred that retaining ring 16 have a coefficient of thermal expansion sufficient to allow it to expand to an inner diameter that is greater than second outer diameter 28 of collar 26 when heated. The same coefficient of thermal expansion of retaining ring 16 allows it, when cooled to an ambient temperature, to return to an inner diameter less than second outer diameter 28 of collar 26. Thus, when retaining ring 16 is heated and placed over collar 26 and then cooled, it will apply an inwardly directed radial force to collar 26, and hold arcuate body 12 and arcuate insert 14 in place. Retaining ring 16, when installed, will preferably have a thickness 82 about equal to the width 84 of shoulder 30, and as such will have an outer diameter about the same as first outer diameter 24 of upper ring 20. Retaining ring 16 preferably has a length similar to collar length 34 of collar 26.

Referring generally to FIG. 8, an alternative embodiment of wing nut 10 includes support member 90 associated with upper ring 20 for securing upper ring 20. Support member 90 holds arcuate body 12 and arcuate insert 14 in place on an opposite side of wing nut 10 from collar 26 and retaining ring 16. Support member 90 enhances the connection of arcuate body 12 with arcuate insert 14 to preclude any potential separation from the previously described radial and inwardly directed force applied to collar 26 by retaining ring 16. In the embodiment shown in FIG. 8, support member 90 is a ring-shaped member. However, support member can have different shapes and configurations for securing upper ring 20, as discussed below. The materials described above for the manufacture of arcuate body 12 and arcuate insert 14 are also suitable for support member 90.

In the exemplary embodiment of FIG. 8, upper ring 20 has pilot 94 adapted to engage support member 90 for securing upper ring 20. However, alternative embodiments for associating support member 90 with upper ring 20 are suitable as long as support member 90 engages both arcuate body 12 and arcuate insert 14. By way of non-limiting example, support member 90 can engage both arcuate body 12 and arcuate insert 14 with pins or threaded fasteners.

Continuing with FIG. 8, first portion 98 of arcuate body 12 and second portion 102 of arcuate insert 14 define pilot 94 when arcuate body 12 and arcuate insert 14 are connected to one another. Pilot 94 is shown as an integrally machined portion of upper ring 20 having a length that extends from an opposite side of upper ring 20 than collar 26, described above. However, pilot 94 may alternatively be a separately connected component. In this embodiment, outer diameter 106 of pilot 94 engages inner diameter 110 of support member 90 for securing upper ring 20. As shown, outer diameter 106 of pilot 94 is less than first outer diameter 24 of upper ring 20.

As depicted in the embodiment of FIG. 8, wing nut 10 has fasteners 112 for securing support member 90 to upper ring 20. Fasteners 112 may be countersunk such that the head or surface of each fastener 112 resides below an outer surface of support member 90 and wing nut 10 when support member 90 is secured to upper ring 20. As shown, fasteners 112 insert through mating lugs 114 around the circumference of support member 90 and connect to corresponding mounting holes 115 disposed in lugs 22 of upper ring 20. Fasteners 112 may be, for example, any threaded fastener known in the art suitable for the environment and forces that will be applied to wing nut 10 in a particular application. Further, the present disclosure contemplates other methods for securing support member 90 to upper ring 20, such as, for example, by welding or pinning.

Without limitation to any particular number of mating lugs 114, FIG. 8 depicts three mating lugs 114 on support member 90 that connect to a corresponding number of lugs 22 on upper ring 20. As shown, arcuate body 12 and arcuate insert 14 each define a lug 22 corresponding to a mating lug 114 on support member 90. Securing support member 90 to both arcuate body 12 and arcuate insert 14 in this manner enhances the connection between arcuate body 12 and arcuate insert 14.

Support member 90 may include stakes 116 to preclude loosening of fasteners 112. In the embodiment shown, stakes 116 are portions of an outer surface of support member 90 deformed onto fasteners 112. Although three stakes 116 are shown for each fastener 112, the present disclosure is not limited to any particular number of stakes 116. Stakes 116 may be provided in any convenient manner known in the art, such as, for example, by using a drift punch and a hammer to deform an outer surface of support member 90 onto fasteners 112.

Similar to fasteners 112, attachment devices 18 may be countersunk such that they reside below an outer surface of upper ring 20 and wing nut 10 when arcuate body 12 and arcuate insert 14 are connected to one another. Further, upper ring 20 of wing nut 10 may include stakes 116 that deform an outer surface of upper ring 20 onto attachment devices 18 to preclude loosening. Stakes 116 are not limited to any particular number and may be provided in any convenient manner as previously described.

A method of installing wing nut 10 may require initially removing a deformed or damaged wing nut from a wing nut pipe segment 50. The damaged wing nut may be removed at any time prior to installing retaining ring 16. Alternatively, the damaged wing nut may be moved axially on pipe segment 50 and left in place a sufficient distance from the end of pipe segment 50 to allow wing nut 10 to be installed. To install wing nut 10, arcuate body 12 radially receives pipe segment 50 through gap 48. Once pipe segment 50 is in place, arcuate insert 14 is inserted into gap 48 so that first and second clearance ends 44 and 46 of arcuate body 12 engage first and second mating ends 54 and 56 of arcuate insert 14. Attachment devices 18 are threaded into attachment openings 68 and 70, and are also used to align first and second mounting threads 76 and 78. Once first and second thread portions 76 and 78 are aligned to form connecting thread 40, the combined unit of arcuate body 12 and arcuate insert 14 is longitudinally moved along pipe segment 50 until it is positioned at pipe segment end 80, thereby making collar 26 accessible.

Retaining ring 16 is heated to a temperature that allows it to expand to an inner diameter greater than second outer diameter 28 of collar 26. The heated and expanded retaining ring 16 is slipped over collar 26, and allowed to cool to an ambient temperature. In one non-limiting example, retaining ring 16 is heated to about 400 degrees Fahrenheit. It is preferred that retaining ring 16 be uniformly heated in a field oven or similar device. However, it is also acceptable to heat retaining ring 16 in any manner that creates near uniform thermal expansion without changing the material properties. After retaining ring 16 has radially retracted, pipe segment 52 may be threaded into collar 26 of wing nut 10. Wing nut 10 is thus a field replaceable wing nut that requires no welding, or machining, and requires no special training of field personnel.

In the embodiments of wing nut 10 that include circular support 90, an operator positions circular support 90 over pipe segment 50 prior to the step of installing arcuate body 12 and arcuate insert 14 as described above. Support member 90 is moved longitudinally along the length of pipe segment 50 and away from pipe segment end 80 to permit installation of arcuate body 12 and arcuate insert 14 between circular support 90 and pipe segment end 80. After retaining ring 16 has been slipped over collar 26 and allowed to cool, as described above, inner diameter 110 of support member 90 is engaged with outer diameter 106 of pilot 94. Subsequently, support member 90 is secured to upper ring 20 using fasteners 112. Each fastener 112 connects through a mating lug 114 and into a mounting hole 115 disposed in a lug 22 on upper ring 20.

Thus, it is shown that the apparatus and methods of the present disclosure readily achieve the ends and advantages mentioned, as well as those inherent therein. While certain preferred embodiments of the disclosure have been illustrated and described, numerous changes in the arrangement and construction of parts and steps may be made by those skilled in the art. All such changes are encompassed within the scope and spirit of the present disclosure as defined by the appended claims.

What is claimed is:

1. A wing nut, comprising:
    an arcuate body defining a first portion of a mounting thread;
    an arcuate insert defining a second portion of a mounting thread, the arcuate insert being complementary to the arcuate body such that when connected to the arcuate body, the arcuate insert and the arcuate body define an upper ring and a collar and the first and second portions of the mounting thread define a complete mounting thread for receiving a threaded male pipe end;
    a retaining ring for securing the collar;
    a support member for securing the upper ring; and
    at least one lug defined on the upper ring that corresponds to at least one mating lug defined on the support member, wherein the support member is secured to the upper ring with a fastener through the at least one mating lug.

2. The wing nut of claim 1, wherein the arcuate body and the arcuate insert define a pilot on the upper ring, and wherein the support member is disposed about the pilot.

3. The wing nut of claim 1, further comprising a pilot on the upper ring, wherein the pilot is adapted to engage the support member.

4. The wing nut of claim 1, wherein the at least one lug on the upper ring comprises a first lug and a second lug positioned on the upper ring, wherein the first lug is defined by the arcuate insert and the second lug is defined by the arcuate body, and wherein the first and second lugs on the upper ring are secured respectively to corresponding first and second mating lugs defined on the support member.

5. The wing nut of claim 1, further comprising a fastener for securing the support member to the upper ring, wherein the surface of the fastener resides below an outer surface of the wing nut when the support member is secured to the upper ring.

6. The wing nut of claim 5, wherein the outer surface of the wing nut is deformable on the fastener.

7. The wing nut of claim 1, wherein the retaining ring is disposed about the collar, wherein the retaining ring is comprised of a material having a coefficient of thermal expansion sufficient to allow it to expand to an inner diameter greater than an outer diameter of the collar when heated, and wherein at an ambient temperature the retaining ring will apply a radial and inwardly directed force to the collar.

8. A wing nut, comprising:
    an arcuate body defining a first portion of a mounting thread;
    an arcuate insert defining a second portion of a mounting thread, the arcuate insert being complementary to the arcuate body such that when connected to the arcuate body, the arcuate insert and the arcuate body define an upper ring and a collar and the first and second portions of the mounting thread define a complete mounting thread for receiving a threaded male pipe end;
    a retaining ring disposed about the collar for securing the collar;
    support member disposed about a pilot on the upper ring for securing the upper ring; and
    at least one lug defined on the upper ring that corresponds to at least one mating lug defined on the support member, wherein the support member is secured to the upper ring with a fastener through the at least one mating lug.

9. The wing nut of claim 8, wherein a first portion of the pilot is defined by the arcuate body and a second portion of the pilot is defined by the arcuate insert when the arcuate body and the arcuate insert are connected to one another.

10. A wing nut, comprising:
    a first arcuate body having a first portion of a mounting thread thereon, the first arcuate body defining a radial arc greater than 180 degrees, the first arcuate body having first and second clearance ends defining a circumferential gap large enough for the first arcuate body to receive a pipe therethrough;
    a second arcuate body having a second portion of a mounting thread thereon, the second arcuate body defining a radial arc complementary to the radial arc of the first arcuate body that when connected to the first arcuate body defines an upper ring and a collar, the second arcuate body having first and second mating ends for engaging the first and second clearance ends;
    a retaining ring disposed about the collar defined by the connected first and second arcuate bodies, the first and second threaded portions defining a complete connecting thread for receiving a threaded male pipe when the first and second arcuate bodies are connected; and
    a support member adapted to engage a pilot on the upper ring, the pilot defined by the connection of the first and second arcuate bodies.

11. The wing nut of claim 10, wherein an outer diameter of the pilot is adapted to engage an inner diameter of the support member.

12. The wing nut of claim 10, further comprising at least one lug positioned on the upper ring that corresponds to at least one mating lug defined on the support member, wherein the at least one mating lug is secured to the at least one lug on the upper ring.

* * * * *